(12) United States Patent
Bischof et al.

(10) Patent No.: US 7,933,736 B2
(45) Date of Patent: Apr. 26, 2011

(54) ELECTRONIC DEVICE FOR RECORDING, STORING AND PROCESSING MEASURED DATA, PARTICULARLY A DATA LOGGER

(75) Inventors: Alois Bischof, Buchs (CH); Beat Rudolf, Landquart (CH)

(73) Assignee: Elpro-Buchs AG, Buchs (CH)

( * ) Notice: Subject to any disclaimer, the term of this patent is extended or adjusted under 35 U.S.C. 154(b) by 433 days.

(21) Appl. No.: 12/000,524

(22) Filed: Dec. 13, 2007

(65) Prior Publication Data

US 2008/0162053 A1 Jul. 3, 2008

Related U.S. Application Data

(63) Continuation of application No. PCT/CH2006/000294, filed on Jun. 1, 2006.

(30) Foreign Application Priority Data

Jun. 14, 2005 (CH) ...................................... 1008/05

(51) Int. Cl.
*G06F 15/00* (2006.01)
*G06F 11/00* (2006.01)

(52) U.S. Cl. ........ 702/127; 702/183; 702/184; 702/188; 710/62; 710/65; 710/66; 710/68; 710/69

(58) Field of Classification Search .......... 702/127–129, 702/188–189, 183–185
See application file for complete search history.

(56) References Cited

U.S. PATENT DOCUMENTS

| | | | | |
|---|---|---|---|---|
| 5,497,419 A | * | 3/1996 | Hill | 380/200 |
| 6,282,362 B1 | * | 8/2001 | Murphy et al. | 386/46 |
| 6,317,639 B1 | | 11/2001 | Hansen | |
| 2004/0019716 A1 | * | 1/2004 | Bychkov et al. | 710/62 |
| 2004/0160993 A1 | | 8/2004 | Ganton et al. | |

(Continued)

FOREIGN PATENT DOCUMENTS

DE 197 05 615 A1 6/1998

(Continued)

OTHER PUBLICATIONS

International Search Report for PCT/CH2006/00294 Dated Aug. 18, 2006.

(Continued)

*Primary Examiner* — Andrew Schechter
*Assistant Examiner* — Phuong Huynh
(74) *Attorney, Agent, or Firm* — Buchanan Ingersoll & Rooney PC

(57) ABSTRACT

A data logger is disclosed wherein a common housing includes different function blocks which are connected to one another. These function blocks include at least one analog/digital converter for conversion of measurement signals into digital input data, a memory unit for recording of digital data and of digitized event data, a timer, a processor unit for processing of data, a power supply source and input and output interfaces for measurement signals or digital data and event data. The processor unit is configured for conversion of digital input data and time data into a format which is compatible with standardized software (e.g., freely available) and which makes it possible to display the processed data using standardized software in tabular and/or graphic form on an output device. The processor unit can be configured to embed the digital input data and time data as well as the event data as protected raw data into the generated data format such that they can be read and processed only with hardware-specific evaluation software.

28 Claims, 2 Drawing Sheets

U.S. PATENT DOCUMENTS

| | | |
|---|---|---|
| 2004/0228369 A1 | 11/2004 | Simmons, III |
| 2006/0058591 A1* | 3/2006 | Garboski et al. ............. 600/301 |
| 2008/0162053 A1 | 7/2008 | Bischof et al. |

FOREIGN PATENT DOCUMENTS

| | | | |
|---|---|---|---|
| EP | 1 089 179 A1 | 4/2001 | |
| EP | 1 367 826 A1 | 12/2003 | |
| JP | 2001-50780 A | 2/2001 | |
| JP | 2004-234119 A | 8/2004 | |
| WO | WO 2006/133582 A1 | 12/2006 | |

OTHER PUBLICATIONS

International Search Report (PCT/Isa/210) for PCT/CH2008/0000432 dated Jan. 20, 2009.

* cited by examiner

ELECTRONIC DEVICE FOR RECORDING, STORING AND PROCESSING MEASURED DATA, PARTICULARLY A DATA LOGGER

RELATED APPLICATIONS

This application claims priority under 35 U.S.C. §119 to Swiss Patent Application No. 01008/05 filed in the Swiss Patent Office on 14 Jun. 2005, and as a continuation application under 35 U.S.C. §120 to PCT/CH2006/000294 filed as an International Application on 1 Jun. 2006, designating the U.S., the entire contents of which are hereby incorporated by reference in their entireties.

TECHNICAL FIELD

An electronic device for recording, storing and processing of measurement data, especially a data logger, is disclosed.

BACKGROUND INFORMATION

Electronic devices of the generic type, so-called data loggers, are used wherever long-term recording of measurement parameters is to be done without the continuous presence of monitoring personnel on site. Thus data loggers are used mainly in field tests, in the monitoring of transport, i.e. in the monitoring of acceleration, humidity and climate values in trucking or rail transport, for recording humidity and temperature values in warehouses, in the pharmaceutical and food industry, for fault analysis of systems, for example for recording of voltage fluctuations in or on a system, for monitoring and alerting in production processes and in quality studies, in research, development and education. Data loggers are also used for recording and monitoring of measurement data in the hobby domain, for example in model aircraft.

The measurement data recorded and stored over a longer time interval can if necessary be further processed, graphically displayed and statistically evaluated for documentation. In addition to measurement data, data loggers often also record all events, such as for example a battery change, operator intervention or changing of a memory card, which occur on the device during a monitoring interval. Thus, these data loggers can meet an especially important criterion of the pharmaceutical, food and chemical industry which can abbreviate the audit trail. The measurement data recorded by the data logger and the data for the audit trail are filed in an internal hardware memory. For evaluation of all data, the data logger is ordinarily connected by cable to the data processing system, for example a PC, in order to read out the data. The readout of data can also take place via a cable-supported or also a cableless LAN or similar network. After reading out the data, they are processed with hardware-specific evaluation software in order to make them available in the form of tables and graphics and to prepare documents or reports. This form of evaluation results in that at any workplace at which the measurement data are to be displayed, the corresponding hardware-specific evaluation software is installed.

Data loggers are also known which are equipped with a display and thus make it possible to display tables and graphics on the display of the device to a limited extent. To do this, the recorded measurement data are further processed by an internal processor and conditioned for display on the display. The reading of the measurement data which are displayed over the hardware-internal display to a limited extent involves presence at the site of the data logger. Graphic or tabular display of the measurement data at one site remote from the location of the data logger is only possible when the data processing system present there, for example a PC, is equipped with the corresponding hardware-specific evaluation software. Other data loggers can be connected to a printer or plotter. For this purpose, in the connection to the additional output device, limited processing of the measurement data by the internal processor has been triggered. The conditioned data can then be printed out or plotted as a table or graphics. The printed table or graphics can be sent to a more remote location if necessary over long-distance transmission devices, for example fax. This detour via the paper form can, however, be time-consuming and often linked to qualitative problems in display. In these known data loggers, direct graphic or tabular display of the measurement data at a location remote from the location of the data logger is only possible when the data processing system present there, for example a PC, is equipped with the corresponding hardware-specific evaluation software.

SUMMARY

An electronic device for recording, storing and processing of measurement data, such as a data logger, is disclosed wherein the measurement data recorded over a time interval can be immediately displayed in graphic and tabular form on a data processing system, especially on a PC which has been set up away from the location of the data logger and which is not equipped with hardware-specific evaluation software. Exemplary embodiments can prepare even more complex evaluations and statistics, documentation and reports when the hardware-specific evaluation software is present.

A data logger comprising interconnected function blocks which are located within a common housing is disclosed wherein the function blocks include at least one analog/digital converter for conversion of measurement signals into digital input data, a memory unit for recording of digital data and of digitized event data, a timer, a processor unit for processing of data, a power supply source and input and output interfaces for measurement signals or digital data and event data, wherein the processor unit is configured to convert digital input data and time data into a data format which is compatible with standardized software such that processed data can be displayed using the standardized software in tabular and/or graphic form on an output device, and wherein the digital input data and time data as well as the event data are embedded by the processor unit as protected raw data into the data format such that they can be read and processed only with hardware-specific evaluation software.

BRIEF DESCRIPTION OF THE DRAWINGS

Other advantages and features will become apparent from the following description of one sample version of the disclosure with reference to the schematics. The figures are not to scale.

DETAILED DESCRIPTION

Figure 1:
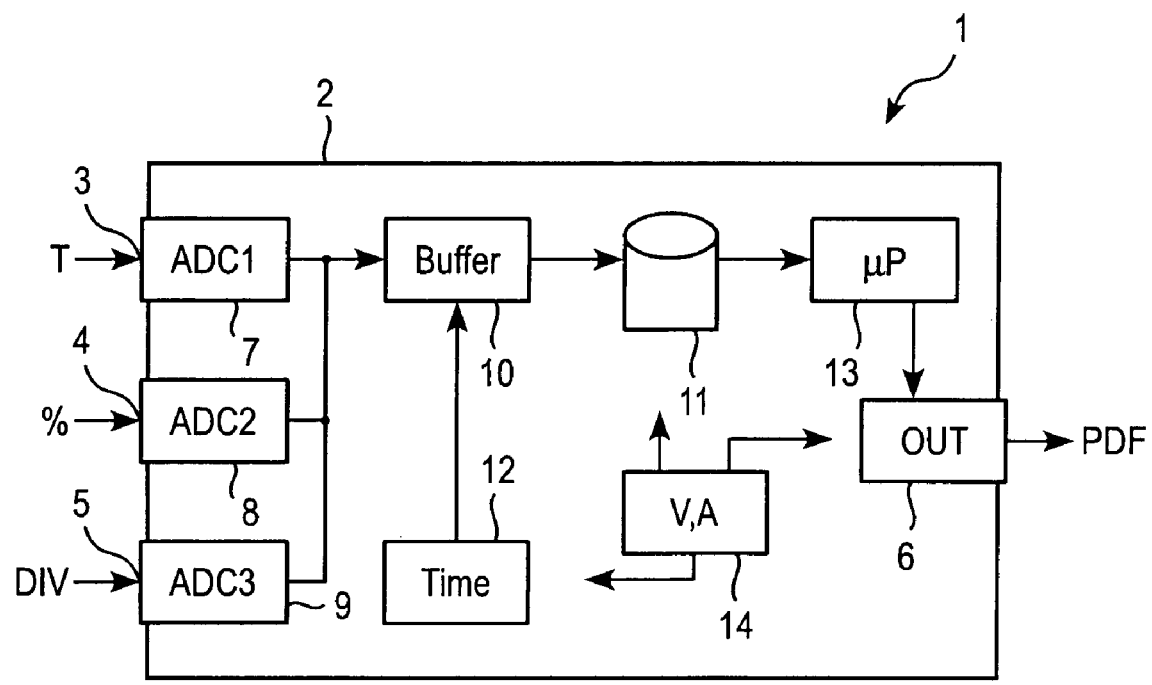
FIG. 1 shows a block diagram of an exemplary data logger.

An exemplary data logger is disclosed which, within a common housing, has different function blocks which are connected to one another. These function blocks comprise at least one analog/digital converter for conversion of measurement signals into digital input data, a memory unit for recording of digital data and of digitized event data, a timer, a processor unit for processing of data, a power supply source and input and output interfaces for measurement signals or digital data and event data. The processor unit is configured to convert digital input data and time data into a format which is compatible with standardized software (e.g., generally available software, such as open source software, which is freely available) such that processed data (e.g., data which has been converted by the processor unit) can be displayed using the standardized software in tabular and/or graphic form on an output device. Furthermore, the processor unit is configured to embed the digital input data and time data as well as the event data as protected raw data into the data format such that they can be read and processed only with hardware-specific evaluation software.

The hardware-internal preparation of measurement data in a format which can be read with generally available software and into which the raw data, such as the measurement data and the event data (audit trail) are embedded in secure form, offers the possibility of a hierarchically staggered evaluation. The measurement data can be displayed in graphic and tabular form on any PC on which generally available software has been installed. Access to the raw data is can be reliably prevented. On PCs which are additionally equipped with hardware-specific evaluation software, the secured region with the raw data can be accessed in order to evaluate them in more complex form and to prepare documentation and reports. Preparation of measurement data in a format which can be read with generally available means and into which the raw data are embedded as a closed, secured data set can also meet the requirements of government monitoring and registration authorities, such as for example the U.S. FDA.

In an advantageous embodiment, the processor unit of the data logger can be made to produce data files in PDF format. The raw data can be embedded by the processor unit into a secured region of the PDF data file. The PDF format from Adobe® is a publicly available open file format for display and transmission of documents. It is available and can run on almost all data processing systems. The PDF format is used by many standardization committees worldwide for secure and reliable exchange and archiving of data.

Readout of data from the data logger into a data processing system, such as a PC, or into a network can take place via an output interface provided on the device. It can be advantageously made as a USB interface, or as a firewall interface or similar, high performance data interface. In particular the named data interfaces are internationally standardized and can enable very high data transfer rates.

The data logger advantageously can have at least one internal sensor and/or one or more input interfaces for connection of sensors for the same or different measurement parameters. In this way a data logger can monitor several objects more or less at the same time and/or can record several parameters.

In particular, data loggers can be used in trucking or rail transport and enable long-term recording of temperatures and humidity.

So that the power supply source, such as batteries, is not unnecessarily burdened, it is advantageous if the format conversion and preparation and the embedding of raw data into a protected region of the generated data format take place by the processor unit only when the recorded data are read out. In one advantageous embodiment, for this purpose, there is a detector which detects whether the output interface of the data logger is connected to an external data processing system and via which, when the data logger is coupled to the external data processing system, such as a PC, the processor unit can be automatically activated.

In one embodiment, on the housing there are a display and an input keyboard for prompt checking of the function of the data logger.

The data logger can have various setting possibilities, for example the real time, the measurement rate, the starting time, the stopping time, etc. For this purpose it can be configured before its use with the aid of the data processing system and hardware-specific software.

The data logger, shown by way of example in FIG. 1, is generally represented as reference number 1. The data logger 1 has a housing 2 which is equipped with inputs and outputs for measurement signals and measurement data and digitized data. In the illustrated embodiment, on the input side three inputs 3, 4 and 5 and one output 6 are indicated. The inputs 3, 4 are provided with connection interfaces for various sensors. In the illustrated embodiment they are interfaces for sensors for temperatures T and for relative humidity measurements %. The third input 5 is used to detect event data DIV which can be, for example, a battery change, operator interventions or changing a memory card during the monitoring interval, etc. The representation as "input 5" should be understood only symbolically and is not intended to mean that it is unconditionally a connection interface for a connecting cable. The data logger also can be equipped with one or more internal sensors and/or one or more connection interfaces for other measurement sensors.

The measurement data T, %, DIV which are present at the inputs 3, 4, 5 are digitized in the pertinent analog/digital converters 7, 8, 9 respectively and are transported to a memory unit 11 via a buffer memory 10 and stored there in digital form. A timer 12 for each measurement signal records the pertinent item of data and the pertinent time and relays this information via the buffer memory 10 to the memory unit 11 where they are stored together with the measurement data. The digitized measurement, time and event data (T, %, DIV) are supplied in front of the output 6 to a microprocessor 13 which further processes them for output or for display on a display provided on the housing 2. A power supply unit which supplies the function blocks with the required energy is provided with reference number 14. For example, the energy is made available from a block battery or the like.

The microprocessor 13 is made such that the digital input data and time data which have been read out from the memory unit 11 can be converted into a data format which is compatible with standardized software and configured such that the processed data can be displayed using this standardized software in tabular and/or graphic form on an output device. Furthermore, the processor unit 13 can be configured to embed the digital input and time data and the event data as protected raw data in the data format such that they can be read and processed only with hardware-specific evaluation software. In the case of the illustrated embodiment this format is the publicly available open PDF format. The raw data are embedded in a closed, protected region of the PDF data file. The PDF data file can be advantageously generated only when the microprocessor 13 is activated via a connection contact which is integrated into the output interface 6. This takes place when a data cable is connected to the output interface 6. For example, the output interface is a USB interface, or a firewall interface or similar high performance data interface. When the battery output is high enough, the PDF data file can also be routinely generated and tracked. The housing 2 of the data logger 1 can also be equipped with an input keyboard which makes it possible to select different modes to initiate limited evaluations in order to display them via a display, to extinguish alarms, etc.

Figure 2:
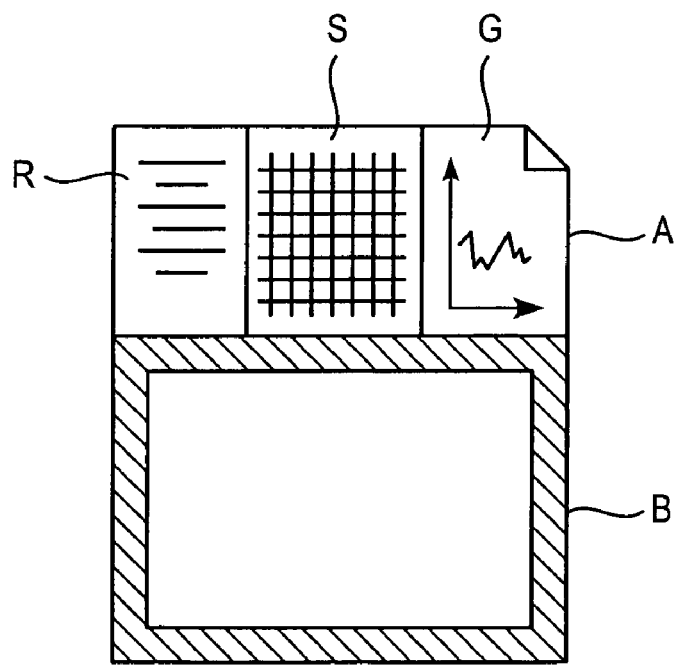
FIG. 2 shows a symbolic schematic of a generated PDF file.

FIG. 2 symbolically shows the structure of the generated PDF data file. The data file has an open region A and a closed, secured region B. The open region can comprise for example a status report R, a tabular listing S of the input data and time data, and a graphic display G of the time progression of the recorded measurement data. They can all be present in the freely available PDF format and can thus be displayed on almost any PC which is equipped with the Adobe® Acrobat Reader® which is freely available at no charge or expense to the user. The digitized raw data (digitized measurement data and time data, event data) are embedded in a closed, secured region of the PDF data file. The raw data are present in the PDF data file and are sent at the same time for example by e-mail when the PDF data file is relayed; but, in an exemplary embodiment, they can only be opened, read and processed on a PC which is equipped with the hardware-specific evaluation software of the data logger.

Figure 3:
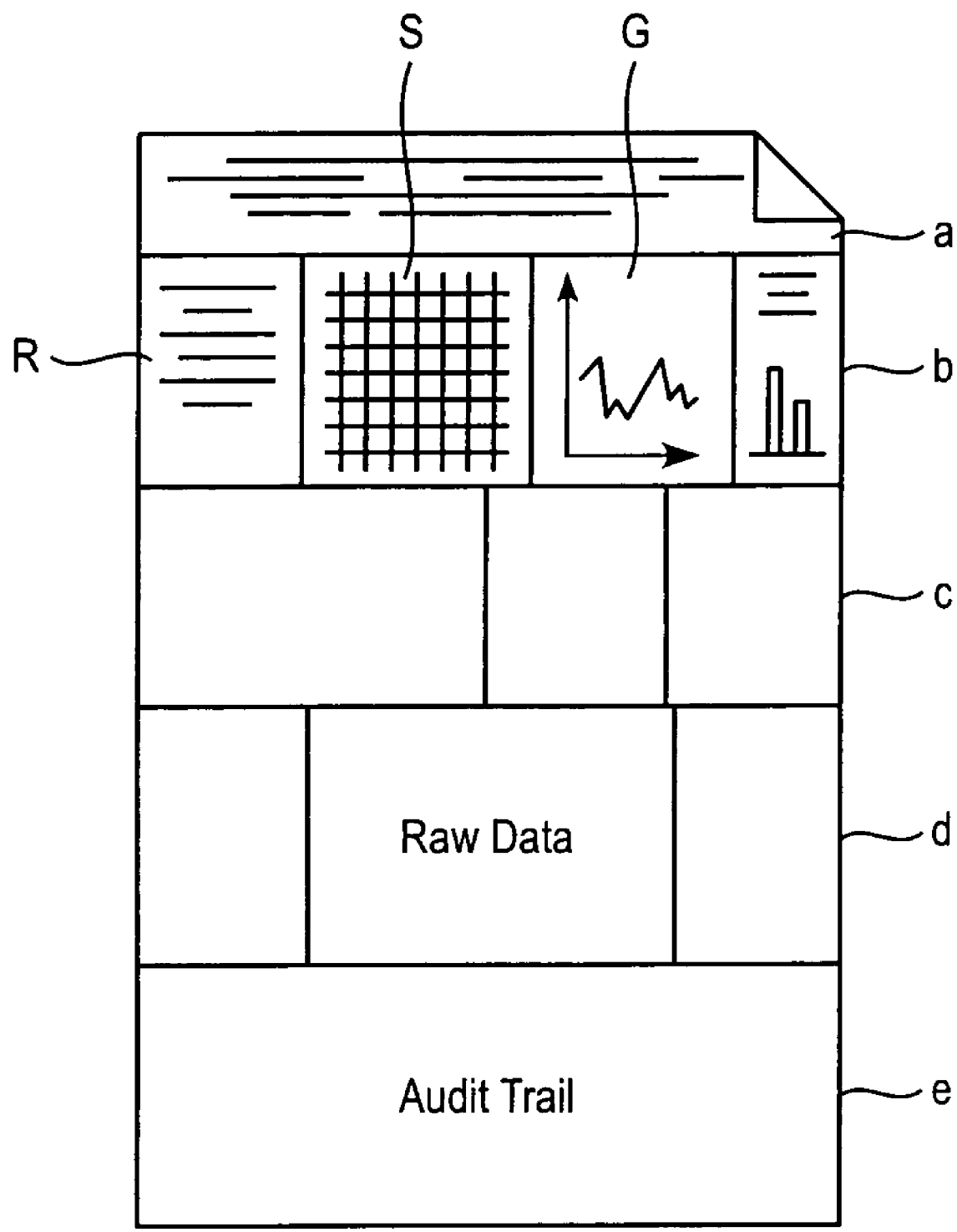
FIG. 3 shows a schematic example of a display using hardware-specific evaluation software.

FIG. 3 schematically sketches a display which has been generated using the hardware-specific evaluation software. It has several regions a-e in which different evaluations, headings, commentaries, statistics and diagrams are displayed. The status report R, the tabular listing S of input data and time data, and the graphic display G of the time progression of the recorded measurement data which were filed in the open region of the PDF data file, can be found again for example in the region b. The raw data are located for example in the region d and can be displayed, read and processed to the full extent. Finally, for example in the region e, the so-called audit trail is shown which documents a complete listing of the recorded events, such as for example battery changing, operator interventions or changing of a memory card which have taken place during a monitoring interval on the data logger.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Data logger comprising interconnected function blocks located within a common housing, wherein the function blocks include:
    at least one analog/digital converter for conversion of measurement signals into digital input data;
    a memory unit for recording of digital data and of digitized event data;
    a timer;
    a processor unit for processing of data;
    a power supply source; and
    input and output interfaces for measurement signals or digital data and event data, wherein the processor unit is configured to convert digital input data and time data into a data format which is compatible with standardized software such that processed data can be displayed using the standardized software in tabular and/or graphic form on an output device, and wherein the digital input data and time data as well as the event data are embedded by the processor unit as protected raw data into the data format such that they can be read and processed only with hardware-specific evaluation software,
    wherein format conversion and preparation and the embedding of the digital input data and time data as well as the event data into a protected region of the data format is activated by the processor unit only when recorded data are read out.

2. Data logger as claimed in claim 1, wherein the processor unit is configured to generate data files in PDF format and the raw data are embedded in a secured region of the PDF data file.

3. Data logger as claimed in claim 1, wherein the output interface is configured as a USB interface or a firewall interface or similar data interface.

4. Data logger as claimed in claim 1, wherein there are at least one internal sensor and/or one or more input interfaces for connection of sensors for the same or different measurement parameters.

5. Data logger as claimed in claim 1, wherein the data logger is configured for long-term recording of temperature and humidity.

6. Data logger as claimed in claim 1, comprising
    a detector which detects coupling of the output interface of the data logger to an external data processing system, and via which the processor unit can be automatically activated when the data logger is coupled to an external data processing system.

7. Data logger as claimed in claim 1, wherein the common housing comprises:
    a display and input keyboard.

8. Data logger as claimed in claim 1, wherein the function blocks are configured using a data processing system and hardware-specific software.

9. Data logger as claimed in claim 2, wherein the output interface is configured as a USB interface or a firewall interface or similar, data interface.

10. Data logger as claimed in claim 9, wherein there are at least one internal sensor and/or one or more input interfaces for connection of sensors for the same or different measurement parameters.

11. Data logger comprising interconnected function blocks located within a common housing, wherein the function blocks include:
    at least one analog/digital converter for conversion of measurement signals into digital input data;
    a memory unit for recording of digital data and of digitized event data;
    a timer;
    a processor unit for processing of data;
    a power supply source; and
    input and output interfaces for measurement signals or digital data and event data, wherein the processor unit is configured to convert digital input data and time data into a data format which is compatible with standardized software such that processed data can be displayed using the standardized software in tabular and/or graphic form on an output device, and wherein the digital input data and time data as well as the event data are embedded by the processor unit as protected raw data into the data format such that they can be read and processed only with hardware-specific evaluation software,
    wherein the processor unit is configured to generate data files in PDF format and the raw data are embedded in a secured region of the PDF data file;
    wherein the output interface is configured as a USB interface or a firewall interface or similar, data interface;
    wherein there are at least one internal sensor and/or one or more input interfaces for connection of sensors for the same or different measurement parameters;
    wherein the data logger is configured for long-term recording of temperature and humidity; and wherein format conversion and preparation and the embedding of raw data into a protected region of the data format is activated by the processor unit only when the recorded data are read out.

12. Data logger as claimed in claim 11, wherein the common housing comprises:
a display and input keyboard.

13. Data logger as claimed in claim 12, wherein the function blocks are configured using a data processing system and hardware-specific software.

14. Data logger comprising interconnected function blocks located within a common housing, wherein the function blocks include:
at least one analog digital converter for conversion of measurement signals into digital output data;
a memory unit for recording of digital data and of digitized event data;
a timer;
a processor unit for processing of data;
a power supply source; and
input and output interfaces for measurement signals or digital data and event data, wherein the processor unit is configured to convert, upon selected activation, digital input data and time data into a data format which is compatible with standardized software such that processed data can be displayed using the standardized software in tabular and/or graphic form on an output device, and to provide the digital input data and time data as well as the event data as raw data in a separate region of the file such that they can be read and processed only with hardware-specific evaluation software;
wherein format conversion and preparation and the embedding of raw data into a protected region of the data format is activated by the processor unit only when recorded data are read out.

15. Data logger as claimed in claim 1, wherein the raw data are embedded by the processor unit into the data format which is compatible with standardized software.

16. Data logger as claimed in claim 15, wherein the processor unit is configured to generate data files in PDF format and the raw data are embedded in a secured region of the PDP data file.

17. Data logger as claimed in claim 14, wherein the output interface is configured as a USB interface or a firewall interface or similar data interface.

18. Data logger as claimed in claim 14, wherein there are at least one internal sensor and/or one or more input interfaces for connection of sensors for the same or different measurement parameters.

19. Data logger as claimed in claim 14, wherein the data logger is configured for long-term recording of temperature and humidity.

20. Data logger as claimed in claim 14, comprising
a detector which detects coupling of the output interface of the data logger to an external data processing system, and via which the processor unit can be automatically activated when the data logger is coupled to an external data processing system.

21. Data logger as claimed in claim 14, wherein the common housing comprises:
a display and input keyboard.

22. Data logger as claimed in claim 14, wherein the function blocks are configured using a data processing system and hardware-specific software.

23. Data logger as claimed in claim 16, wherein the output interface is configured as a USB interface or a firewall interface or similar, data interface.

24. Data logger as claimed in claim 23, wherein there are at least one internal sensor and/or one or more input interfaces for connection of sensors for the same or different measurement parameters.

25. Data logger as claimed in claim 24, wherein the data logger is configured for long-term recording of temperature and humidity.

26. Data logger comprising interconnected function blocks located within a common housing, wherein the function blocks include:
at least one analog/digital converter for conversion of measurement signals into digital input data;
a memory unit for recording of digital data and of digitized event data;
a timer;
a processor unit for processing of data;
a power supply source; and
input and output interfaces for measurement signals or digital data and event data, wherein the processor unit is configured to convert digital input data and time data into a data format which is compatible with standardized software such that processed data can be displayed using the standardized software in tabular and/or graphic form on an output device, and wherein the digital input data and time data as well as the event data are embedded by the processor unit as protected raw data into the data format such that they can be read and processed only with hardware-specific evaluation software,
wherein the raw data are embedded by the processor unit into the data format which is compatible with standardized software;
wherein the processor unit is configured to generate data files in PDF format and the raw data are embedded in a secured region of the PDP data file;
wherein the output interface is configured as a USB interface or a firewall interface or similar, data interface;
wherein there are at least one internal sensor and/or one or more input interfaces for connection of sensors for the same or different measurement parameters;
wherein the data logger is configured for long-term recording of temperature and humidity; and
wherein format conversion and preparation and the embedding of raw data into a protected region of the data format is activated by the processor unit only when the recorded data are read out.

27. Data logger as claimed in claim 26, wherein the common housing comprises:
a display and input keyboard.

28. Data logger as claimed in claim 26, wherein the function blocks are configured using a data processing system and hardware-specific software.

* * * * *